United States Patent
Wu

(10) Patent No.: US 11,079,763 B2
(45) Date of Patent: Aug. 3, 2021

(54) TRAJECTORY PLANNING METHOD AND SYSTEM

(71) Applicant: PEGATRON CORPORATION, Taipei (TW)

(72) Inventor: Chia-Hsiu Wu, Taipei (TW)

(73) Assignee: Pegatron Corporation, Taipei (TW)

( * ) Notice: Subject to any disclaimer, the term of this patent is extended or adjusted under 35 U.S.C. 154(b) by 205 days.

(21) Appl. No.: 16/450,007

(22) Filed: Jun. 24, 2019

(65) Prior Publication Data

US 2020/0064849 A1    Feb. 27, 2020

(30) Foreign Application Priority Data

Aug. 22, 2018   (TW) ................................. 107129309

(51) Int. Cl.
  *G05D 1/02*     (2020.01)
  *G01C 21/00*    (2006.01)

(52) U.S. Cl.
  CPC ......... *G05D 1/0212* (2013.01); *G01C 21/005* (2013.01); *G05D 1/027* (2013.01); *G05D 1/0231* (2013.01); *G05D 1/0272* (2013.01)

(58) Field of Classification Search
  CPC .... G05D 1/0212; G05D 1/0231; G05D 1/027; G05D 1/0272; G01C 21/005
  See application file for complete search history.

(56) References Cited

U.S. PATENT DOCUMENTS

| | | | | |
|---|---|---|---|---|
| 10,518,879 | B1 * | 12/2019 | Zhang | G06K 9/00664 |
| 2009/0248295 | A1 * | 10/2009 | Grewe | G01C 21/3461 |
| | | | | 701/533 |
| 2019/0377952 | A1 * | 12/2019 | Kim | G06K 9/00744 |

FOREIGN PATENT DOCUMENTS

| | | | |
|---|---|---|---|
| CN | 107702723 A | 2/2018 | |
| TW | I396830 B | 5/2013 | |
| WO | WO-2013165391 A1 * | 11/2013 | H04W 4/33 |

* cited by examiner

Primary Examiner — Rami Khatib
Assistant Examiner — Shahira Baajour
(74) *Attorney, Agent, or Firm* — Muncy, Geissler, Olds & Lowe, P.C.

(57) ABSTRACT

The following steps are executed by a self-propelled device and a calculating device: the self-propelled device moves on a path to form a moving trajectory; the calculating device obtains a sensing data file generated by a sensing module of the self-propelled device on the path; after the sensing data file is imported into a simultaneous localization and mapping algorithm, a map corresponding to the path can be constructed; if the sensing data file is imported into a loop closure algorithm, a pose at each unit time can be obtained, and an optimized trajectory can be formed; when the sensing data file is imported into a cartographer localization algorithm, a reference trajectory can be constructed, and whether the reference trajectory approaches an optimized trajectory is determined; and parameters capable of being imported into the self-propelled device are obtained according to the reference trajectory which approaches the optimized trajectory.

10 Claims, 5 Drawing Sheets

TRAJECTORY PLANNING METHOD AND SYSTEM

CROSS-REFERENCE TO RELATED APPLICATION

This non-provisional application claims priority under 35 U.S.C. § 119(a) to Patent Application No. 107129309 filed in Taiwan, R.O.C. on Aug. 22, 2018, the entire contents of which are hereby incorporated by reference.

BACKGROUND

Technical Field

The application relates to the technology of trajectory planning of a self-propelled device, and in particular, relates to a trajectory planning method and system for correcting parameters of a cartographer localization algorithm based on an optimized trajectory.

Related Art

In recent years, the artificial intelligence (AI) industry has developed vigorously, and related products have constantly appeared on the market. One of the products is applied to operation of a service robot, including patrol, guidance, document delivery, and the like executed by the service robot. One of core technologies is indoor localization and navigation. During indoor localization and navigation, localization and mapping need to be timely simulated in advance. For example, an SLAM technology can be adopted, but the effect of the SLAM affects the operating capability of the robot.

In the prior art, a mechanism of the SLAM mainly includes the processes of firstly recording the robot by adopting external high-order cameras and establishing an indoor localization and navigation chart of the robot in a specific occasion.

When the indoor localization and navigation chart is constructed in a traditional mode of instantly simulating SLAM, for obtaining high-resolution images, many high-definition cameras are needed for recording a true trajectory, so that related hardware and software devices are quite expensive, and more cameras may be erected according to the sizes of a field. Furthermore, if a field needs to be replaced, all the cameras need to be erected again.

SUMMARY

The application discloses a trajectory planning method and system. According to technical objectives, the method uses a loop closure algorithm to calculate and obtain an optimized trajectory, the optimized trajectory is compared with a reference trajectory obtained by a cartographer localization algorithm, whether the reference trajectory approaches the optimized trajectory is determined, and parameters capable of being imported into the self-propelled device moving on a path are obtained according to the reference trajectory which approaches the optimized trajectory.

An embodiment according to the method is applied for a self-propelled device. The self-propelled device moves on a path to form a moving trajectory. The trajectory planning method includes the steps that: a calculating device obtains a sensing data file generated by a sensing module of the self-propelled device on the path, the sensing data file is imported into an SLAM algorithm to construct a map corresponding to the path, and then, the sensing data file is imported into a loop closure algorithm to obtain a pose at each unit time, so as to construct an optimized trajectory on the map.

Subsequently, the obtained sensing data file is imported into a cartographer localization algorithm to obtain a pose at each unit time and construct a reference trajectory on the map, the reference trajectory corresponding to a moving trajectory of the self-propelled device on the path. Then, the reference trajectory and the optimized trajectory are compared, and the calculating device determines whether the reference trajectory approaches the optimized trajectory. If it is determined that the reference trajectory approaches the optimized trajectory, parameters in the cartographer localization algorithm are imported into the self-propelled device. If it is determined that the reference trajectory does not approach the optimized trajectory, the parameters in the cartographer localization algorithm are adjusted; a new reference trajectory is calculated by the cartographer localization algorithm, the new reference trajectory is also compared with the optimized trajectory, and whether the new reference trajectory approaches the optimized trajectory is determined. The calculation is repeated until the reference trajectory which approaches the optimized trajectory is obtained; and then, the parameters in the cartographer localization algorithm corresponding to the above reference trajectory are imported into the self-propelled device, so that the self-propelled device moves on the path according to the parameters.

Further, the sensing data file includes a plurality of pieces of sensing data corresponding to time, position and directionality, and the sensing data can be generated by at least one of a light detection and ranging (LiDAR), an inertial measurement unit (IMU) and an odometer of the sensing module.

Further, the mode of comparing the reference trajectory with the optimized trajectory is realized by using a difference distribution method. In the difference distribution method, a pose error value of the reference trajectory relative to the optimized trajectory at each unit time is calculated, so as to obtain multiple groups of pose error values at multiple unit time, and then, a distribution ratio of a plurality of error ranges of the pose error values can be obtained.

The distribution ratio of the minimum error range in the error ranges is taken and can be compared with a preset distribution ratio, so as to determine whether the reference trajectory approaches the optimized trajectory.

Further, in the trajectory planning method, the parameters in the cartographer localization algorithm are adjusted according to a principle of low latency.

In an embodiment according to the trajectory planning system, the trajectory planning system includes a self-propelled device. The self-propelled device is provided with a sensing module used for sensing a topographical feature on the path of the self-propelled device, so as to generate a sensing data file. The trajectory planning system also includes a calculating device used for obtaining the sensing data file. The reference trajectory which most approaches the optimized trajectory can be obtained according to the trajectory planning method in the above embodiment, and the parameters in the cartographer localization algorithm corresponding to the above reference trajectory are imported into the self-propelled device.

The trajectory planning method and system provided by the application adopt the SLAM algorithm. The loop closure algorithm is adopted to perform global adjustment on the moving trajectory of the self-propelled device so as to generate the optimized trajectory, and the optimized trajectory is compared with the reference trajectory obtained by a cartographer localization algorithm according to the sensing data file, so that the advantages and disadvantages of the related parameters in trajectory localization effect can be detected, and the cost generated by the prior art for erecting high-order cameras and the like can be saved.

In order to further understand the technologies, methods and effects of the present application for achieving the set objectives, the detailed descriptions and drawings of the present application are described below. The objectives, features and characteristics of the present application can be further understood specifically. However, the appended drawings are provided for reference and illustration only and are not intended to limit the present application.

DETAILED DESCRIPTION OF THE EMBODIMENTS

Figure 1:
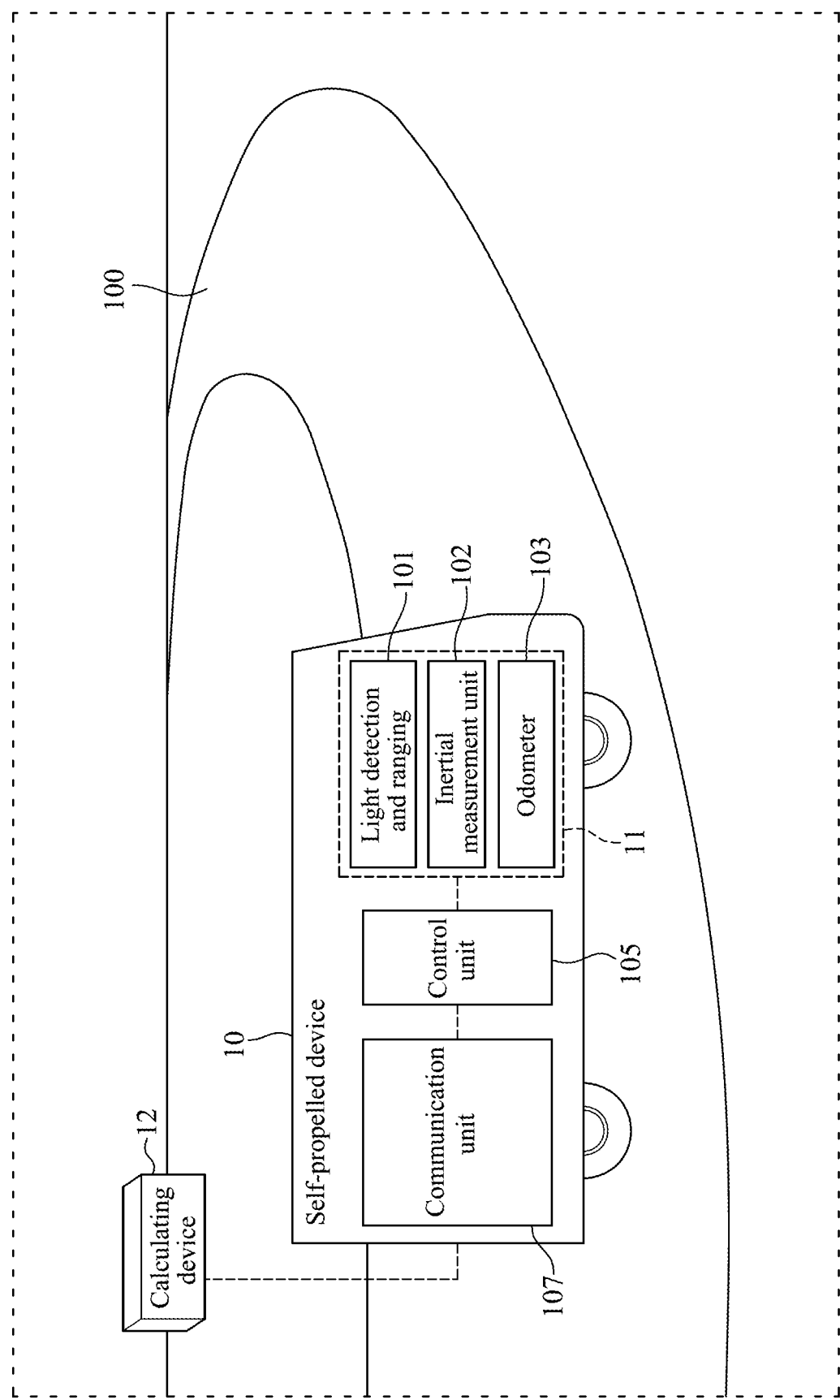
FIG. 1 is a schematic diagram showing a situation that a self-propelled device moves on a path in a trajectory planning method.

The application provides a trajectory planning method and system which are applied for a self-propelled device capable of sensing surrounding environment and a moving path by using an internal sensor. FIG. 1 is a schematic diagram showing a situation that a self-propelled device 10 moves on a path 100. The self-propelled device 10 moves on the path 100 to form a moving trajectory (not shown in FIG. 1). The self-propelled device 10 is provided with a sensing module 11 used for sensing topographical features on the path 100 of the self-propelled device 10, so as to generate a sensing data file. The sensing data file includes a plurality of pieces of sensing data corresponding to time, position and directionality. According to an embodiment, the sensing data is generated by at least one of a light detection and ranging (LiDAR) 101, an inertial measurement unit (IMU) 102 and an odometer 103 in the sensing module 11.

The LiDAR 101 is a sensor for achieving a ranging objective through light detection, pulsed light is utilized for scanning the distance between the self-propelled device 10 and the topographical features in a surrounding environment, three-dimensional information of the surrounding environment can be constructed according to received light wave data, and the objective of localizing the self-propelled device 10 can be realized.

The IMU 102 is an inertial navigator capable of sensing the pose of a robot, sensors, such as an accelerometer and a gyroscope, can be utilized for measuring the pose of the self-propelled device 10. Recorded data includes angular velocity and acceleration of the self-propelled device 10 in three axial directions for example.

The self-propelled device 10 is also provided with the odometer 103 capable of sensing the cruise mileage of the self-propelled device. If the odometer 103 is applied to the self-propelled device 10 drive by a wheel axle, the odometer 103 can calculate the mileage of the self-propelled device 10 according to data, such as circumference and rotation speed, of the wheel axle, and can also obtain directional data.

The self-propelled device 10 is provided with a control unit 105 and a communication unit 107, the control unit 105 is electrically connected with the sensing module 11, and an operating system, such as a robot operating system (ROS), can be operated. When the control unit 105 receives data sensed by each sensing component in the sensing module 11, a sensing data file is formed and can be output to a calculating device 12 through the communication unit 107, and part of the trajectory planning method is executed by the calculating device 12.

Figure 2:
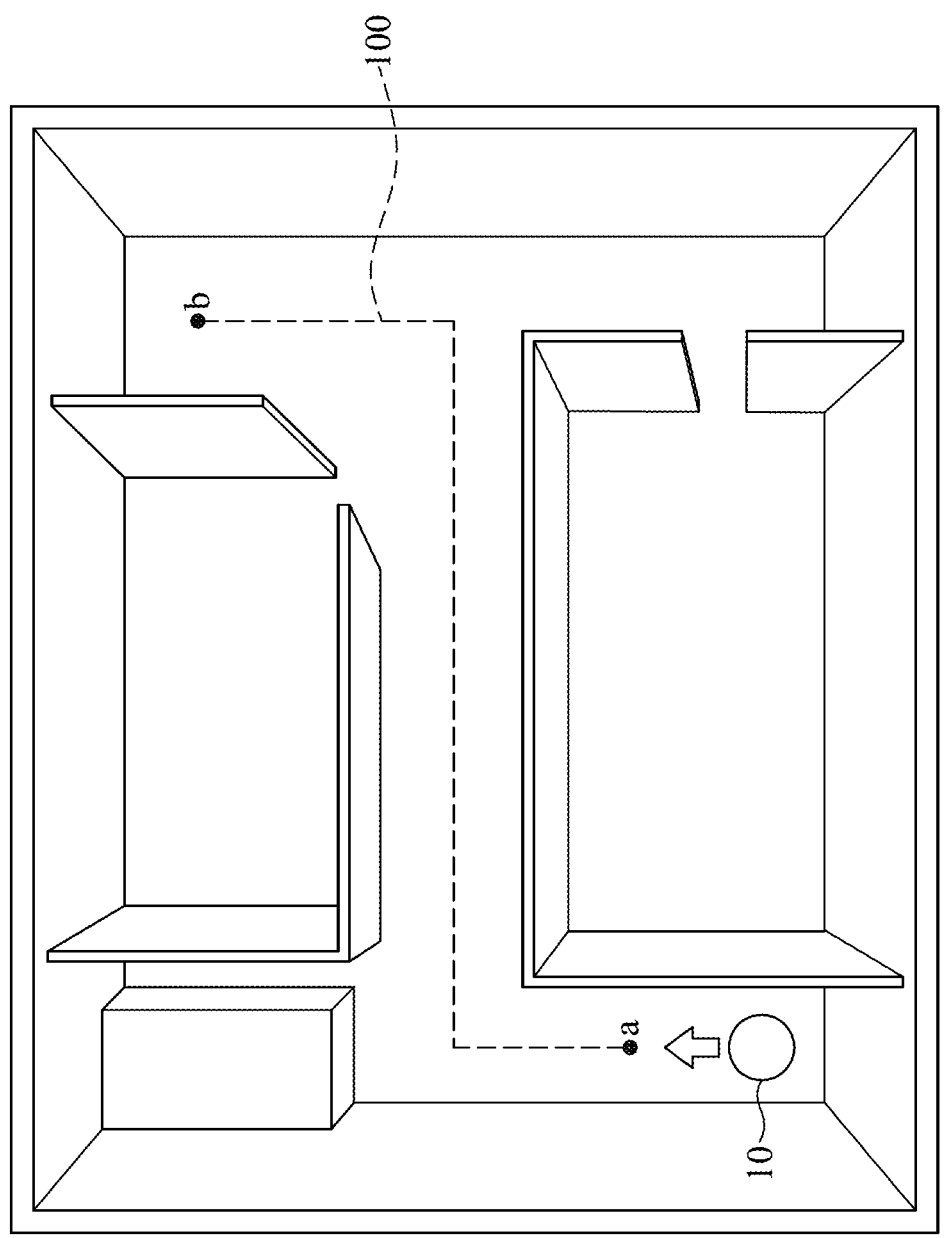
FIG. 2 is a schematic diagram showing a situation that the self-propelled device moves in an indoor scene.
Figure 3:
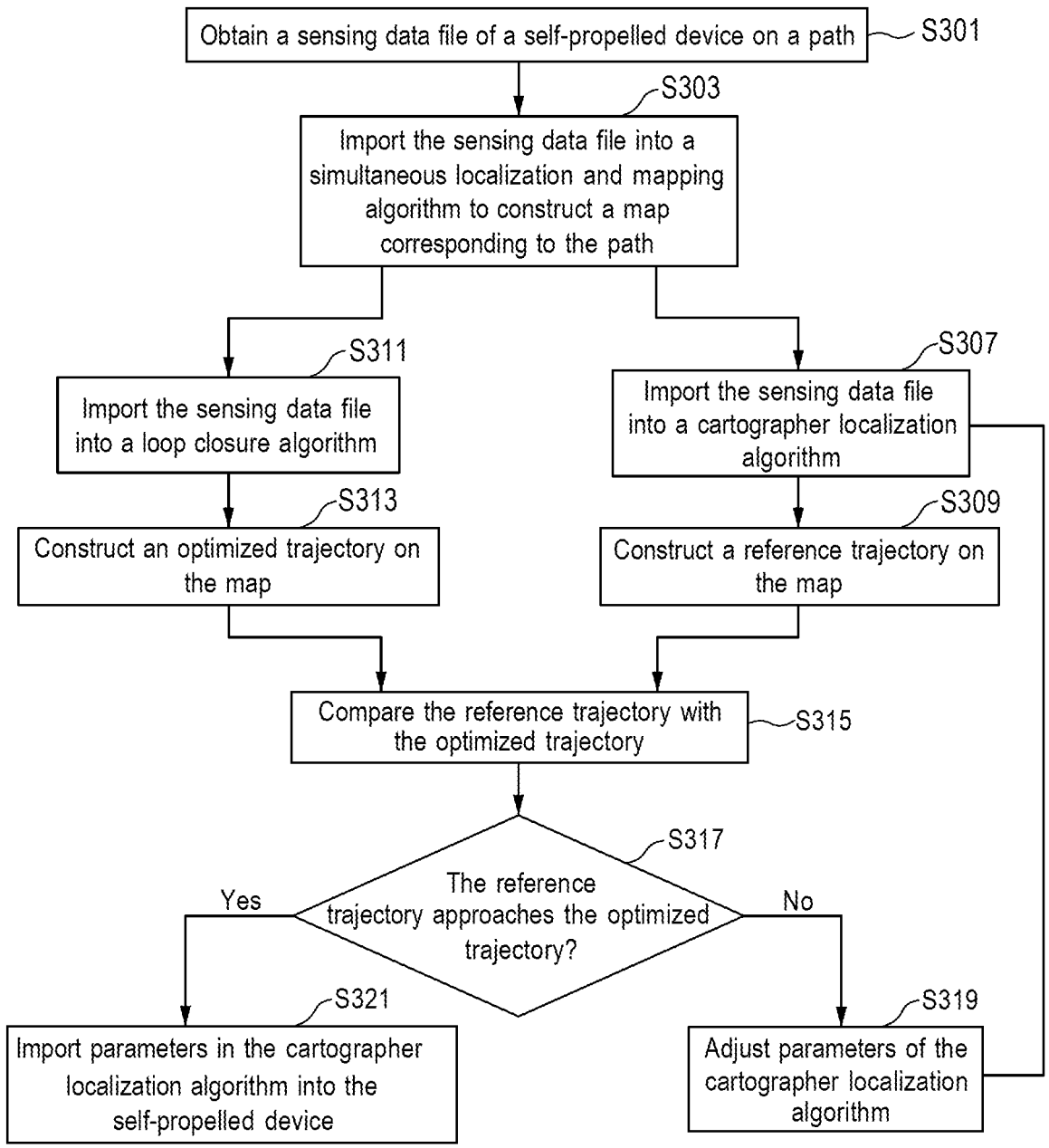
FIG. 3 is a diagram of a procedure embodiment of a trajectory planning method.

FIG. 2 is a schematic diagram showing a situation that the self-propelled device moves in an indoor scene. FIG. 3 is a diagram of a procedure embodiment of a trajectory planning method. Referring to FIG. 1, FIG. 2 and FIG. 3 together, in the trajectory planning method, a start point a and an end point b are set in the indoor scene, and the self-propelled device 10 moves on a path between the start point a and the end point b. In an implementation, a person can operate the self-propelled device 10 to move on the path 100, the sensing module 11 in the self-propelled device 10 simultaneously operates and is used for sensing various topographical features when the self-propelled device 10 moves on the path between the start point a and the end point b, so as to generate a sensing data file, and the ROS of the control unit 105 records the sensing data file generated by the sensing module. The sensing data file includes a plurality of pieces of sensing data, and the sensing data corresponds to numerical values such as time, position (such as X, Y and Z values) and directionality.

The trajectory planning system further includes a calculating device 12 with a data processing capability. According to step S301, the calculating device 12 obtains, through the communication unit 107, the sensing data file generated by the sensing module 11 in the self-propelled device 10 moving on the path 100.

Subsequently, according to step S303, after the calculating device 12 obtains the sensing data file, the sensing data file is imported into a simultaneous localization and mapping algorithm, and a map corresponding to the path 100 is constructed according to the sensing data file obtained by the sensing module 11 of the self-propelled device 10 on the path 100.

After the map is constructed, according to step S311, the sensing data file is imported into a loop closure algorithm to obtain a pose at each unit time. The main objective of the loop closure algorithm is to eliminate cumulative error generated after the self-propelled device moves for a section of route. One of used methods is as follows: when the self-propelled device moves to a certain position, the data obtained when the self-propelled device arrives at the same position last time is determined, and a position with a small error at the previous time can be mainly used for avoiding increasing offset due to long time, thereby eliminating the cumulative error. Then, in step S313, an optimized trajectory generated by the above optimization process can be constructed on the map.

On the other hand, in step S307, the sensing data file is imported into a cartographer localization algorithm to obtain a pose at each unit time, and the pose includes time, position, direction and the like. According to step S309, a reference trajectory is constructed on the map, and the reference trajectory is corresponding to the moving trajectory of the self-propelled device 10 on the path 100.

In step S315, the optimized trajectory and the reference trajectory are compared to obtain distribution characteristics of the two trajectories. Then, according to step S317, whether the reference trajectory approaches the optimized trajectory is determined by adopting a method, such as a difference distribution method.

At this time, a comparison threshold can be set by the system, and whether the reference trajectory approaches the optimized trajectory is determined according to an error value between the reference trajectory and the optimized trajectory. In the above difference distribution method, a preset distribution ratio is set to serve as a basis for detecting whether the reference trajectory approaches the optimized trajectory.

If it is determined that the reference trajectory does not approach the comparison threshold of the optimized trajectory, that is, the reference trajectory does not approach the optimized trajectory, according to step S319, parameters in the cartographer localization algorithm in step S307 are adjusted; step S307 is executed again, that is, the above sensing data file is imported, and a new reference trajectory is obtained by calculation with the cartographer localization algorithm with the adjusted parameters (step S309); and then, the new reference trajectory is compared with the optimized trajectory until the reference trajectory approaches the comparison threshold of the optimized trajectory, that is, the reference trajectory approaches the optimized trajectory. It is worth mentioning that, the parameters in the cartographer localization algorithm can be adjusted according to a principle of low latency. In this embodiment, for example, the parameters in the cartographer localization algorithm can be the weight of the sensing data output by the LiDAR 101, the IMU 102 or the odometer 103, the friction coefficient of the self-propelled device 10, weights corresponding to different noise interferences in an environment, and the like, but are not limited thereto.

If it is determined that the reference trajectory already approaches the optimized trajectory, according to step S321, the parameters in the cartographer localization algorithm applied for the self-propelled device 10 are obtained, and the above parameters can be imported into the self-propelled device 10, so that when the self-propelled device 10 moves on the path 100 actually according to the received parameters, the moving trajectory corresponding to the above reference trajectory which approaches the optimized trajectory is obtained.

According to the trajectory planning method disclosed by this embodiment, firstly, the calculating device 12 can repeatedly adjust the parameters in the cartographer localization algorithm, so as to determine whether the reference trajectory approaches the optimized trajectory; and parameters of the self-propelled device 10 are related to the parameters in the cartographer localization algorithm, and then, the parameters corresponding to the reference trajectory which most approaches the optimized trajectory are imported into the self-propelled device 10, so that when the self-propelled device 10 moves on the path 100 actually according to the received parameters, the moving trajectory corresponding to the above reference trajectory which approaches the optimized trajectory is obtained.

At this time, the obtained optimized trajectory and a plurality of reference trajectories can be drawn in the same plane coordinates. Referring to an optimized trajectory 40 and a reference trajectory 401 between a start point a and an end point b as shown in FIG. 4, a reference trajectory which approaches the optimized trajectory 40 to a certain degree and parameters thereof can be obtained by the trajectory planning method.

Figure 4:
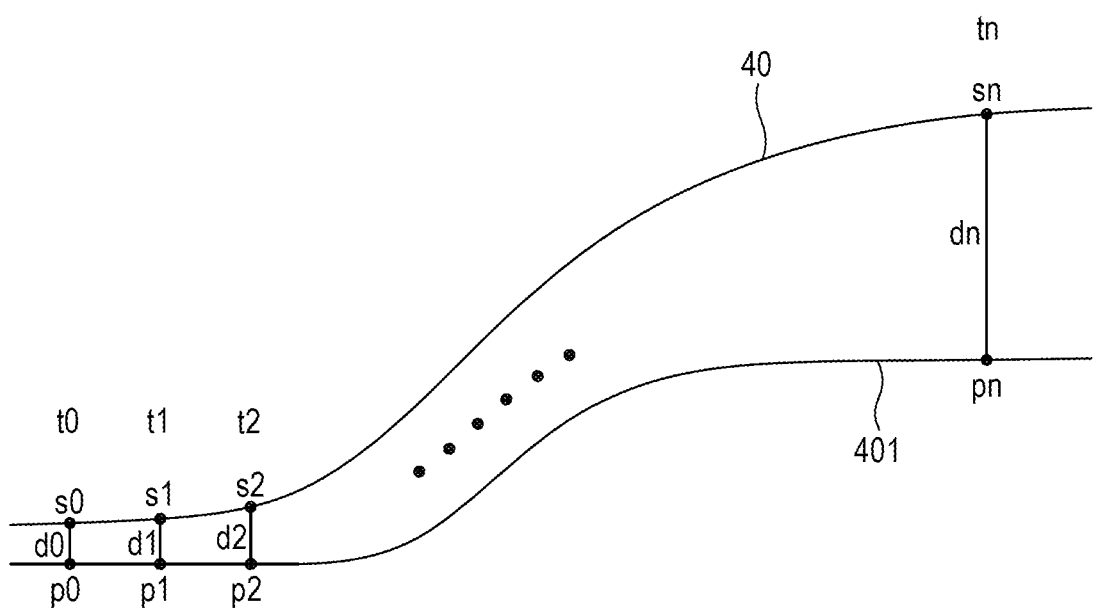
FIG. 4 is a schematic diagram of an embodiment of a pose error value at each unit time based on an optimized trajectory and a reference trajectory in a trajectory planning method.
Figure 5:
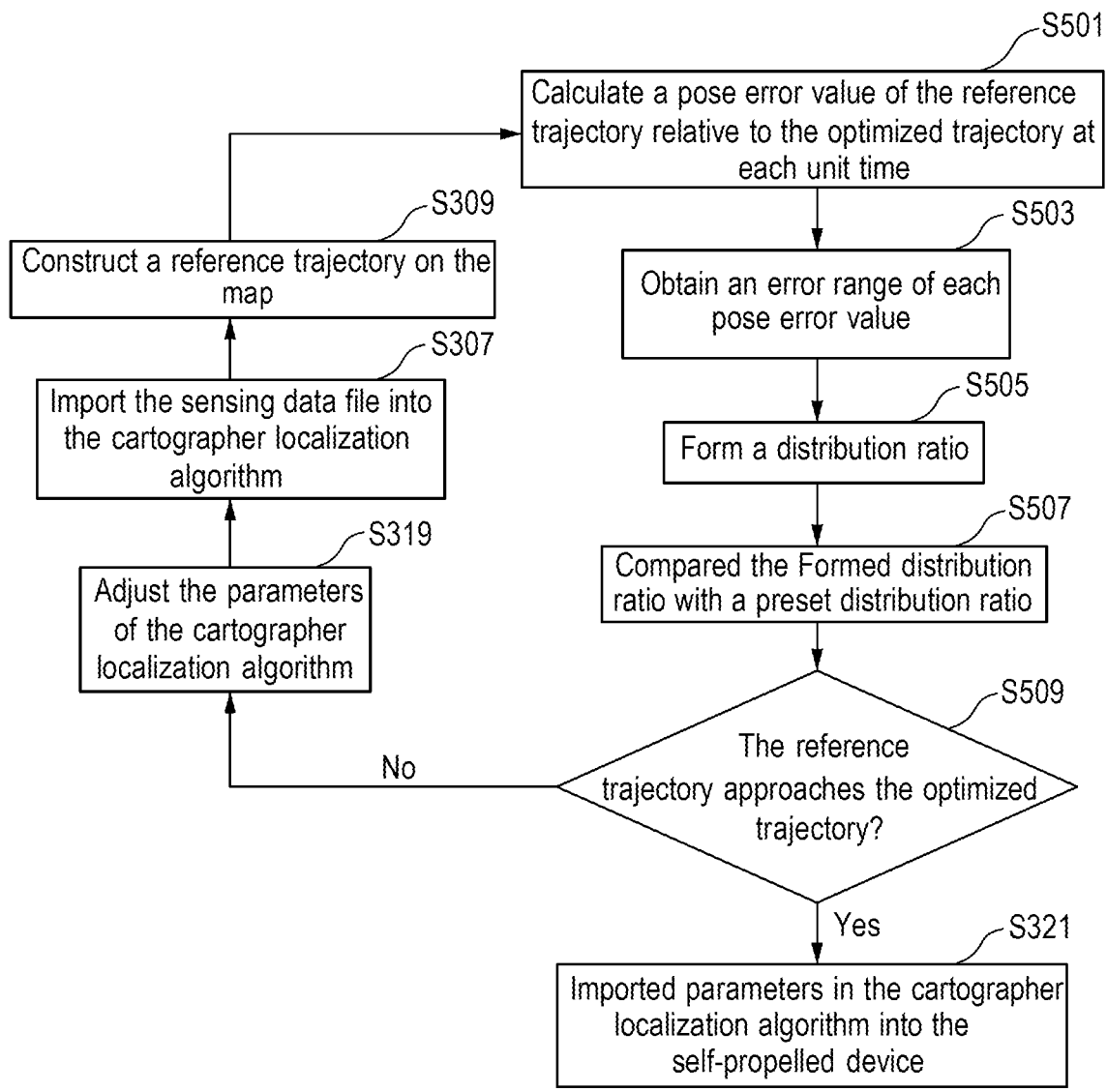
FIG. 5 is a diagram of a procedure embodiment of executing a difference distribution method in a trajectory planning method.

In the procedure embodiment as shown in FIG. 3, the difference distribution method can be used as a comparison method for judging whether the reference trajectory approaches the optimized trajectory, and a comparison mode can refer to FIG. 4. FIG. 4 is a schematic diagram of an embodiment of a pose error value at each unit time based on an optimized trajectory and a reference trajectory in a trajectory planning method. FIG. 5 is a diagram of a procedure embodiment of executing a difference distribution method in a trajectory planning method.

Two trajectories shown in FIG. 4 include an optimized trajectory 40 and a reference trajectory 401 which are drawn according to localization information. In this difference distribution method, the pose error value of the reference trajectory relative to the optimized trajectory at each unit time is calculated. This embodiment shows reference positions p0, p1, p2, . . . , pn of the reference trajectory 401 at each time t0, t1, t2, . . . , tn, and the reference positions p0, p1, p2, . . . , pn are compared with the optimized positions s0, s1, s2, . . . , sn of the optimized trajectory 40 at the same time, thereby obtaining the pose error value at each time (in FIG. 4, distance errors d0, d1, d2, . . . , dn are taken as examples but not limited thereto). As shown in FIG. 5, according to step S501, the pose error value of the reference trajectory relative to the optimized trajectory at each unit time, namely the position and direction difference at each unit time, can be calculated similarly. According to step S503, when the system divides the pose error values into a plurality of error ranges, the error range of each pose error value can be obtained. Therefore, according to step S505, a distribution ratio of a plurality of error ranges of the pose error values can be obtained, thereby obtaining the difference distribution of the two trajectories (reference trajectory and optimized trajectory).

In order to obtain the reference trajectory which approaches the optimized trajectory, a preset distribution ratio can be provided by the system. By using the difference distribution method, according to step S507, the distribution ratio of the error range formed between the reference trajectory obtained each time and the optimized trajectory is compared with the preset distribution ratio, so as to serve as a basis for detecting whether the reference trajectory already approaches the optimized trajectory.

According to step S509, the trajectory planning method operating in the calculating device 12 determines whether the distribution ratio of the minimum error range in the above error ranges is greater than the preset distribution ratio. If the current distribution ratio of the minimum error range is less than the preset distribution ratio, the current reference trajectory still does not approach the optimized trajectory, and then, the steps as shown in FIG. 3 are executed. According to step S319, the parameters in the cartographer localization algorithm are adjusted; according to step S307, the above sensing data file is imported and is calculated by the cartographer localization algorithm with the adjusted parameters so as to obtain a pose at each unit time again; and a new reference trajectory is obtained (step S309). Then, the steps in the flow of the difference distribution method as shown in FIG. 5 are executed again. The pose error value of the new reference trajectory relative to the optimized trajectory at each unit time is calculated (step S501); the error range of each pose error value is obtained (step S503); a distribution ratio of a plurality of error ranges of the pose error value is obtained (step S505); at least one of the distribution ratios of the error ranges is taken and compared with the preset distribution ratio (step S507); and whether the new reference trajectory approaches the optimized trajectory is determined (step S509).

According to judgment in step S509, when the distribution ratio of the minimum error range is greater than the preset distribution ratio, the reference trajectory already approaches the optimized trajectory. According to step S321 as shown in FIG. 3, the parameters in the cartographer localization algorithm applied for the self-propelled device 10 are obtained, and the above parameters can be imported into the self-propelled device 10, so that when the self-propelled device 10 moves on the path 100 according to the received parameters, the moving trajectory corresponding to the above reference trajectory which approaches the optimized trajectory is obtained.

For example, the obtained pose error value at each unit time can be a distance, that is, an error distance between two point coordinate positions of two trajectories at the same unit time is calculated, and a plurality of distance error values, such as d1, d2, d3, . . . , dn, can be formed. A plurality of error ranges, such as D0 (1 meter), D1 (0.1 meter), D2 (0.05 meter) and D3 (0.01 meter), can be set by the system, thereby calculating the ratio at that the position error of two curves at each time point is within 0.01 meter (D3), the ratio at that the error is within 0.05 meter (D2), the ratio at that the error is within 0.1 meter (D1), and the ratio at that the error is within 1 meter (D0). The ratio values show the curve characteristics of the corresponding reference trajectories, thereby evaluating the reference trajectory which most approaches the optimized trajectory.

In an embodiment, the system can only consider the minimum error range (such as D3) which is compared with the preset distribution ratio to serve as a basis for judging whether the reference trajectory approaches the optimized trajectory. If the distribution ratio of the minimum error range is less than the preset distribution ratio, the parameters in the cartographer localization algorithm need to be adjusted continuously, then the sensing data file is imported into the cartographer localization algorithm with the adjusted parameters to calculate a pose at each unit time again, so as to obtain a new reference trajectory, and whether the new reference trajectory approaches the optimized trajectory is determined again; and if the new distribution ratio in the minimum error range is greater than the preset distribution ratio, the new reference trajectory already approaches the optimized trajectory, and the parameters in the cartographer localization algorithm with the adjusted parameters are imported into the self-propelled device 10.

By repeating the above flows, the trajectory planning method can effectively reduce the error between the reference trajectory and the optimized trajectory, thereby being favorable for improving localization and navigation of the self-propelled device.

In conclusion, the embodiments of the trajectory planning method and system disclosed above are mainly as follows: the sensing module of the self-propelled device moves on the path to generate the sensing data file, the sensing data file is imported into the SLAM algorithm to construct the map, the sensing data file is imported into the loop closure algorithm to perform global adjustment on the moving trajectory of the self-propelled device, so as to generate the optimized trajectory, the sensing data file is imported into the cartographer localization algorithm to generate the reference trajectory, and then whether the reference trajectory approaches the optimized trajectory is determined so as to detect the advantages and disadvantages of the parameters of the cartographer localization algorithm, so that the self-propelled device 10 can be simulated first in the calculating device 12, so as to obtain a parameter adjustment direction more quickly, and the cost generated by the prior art for erecting high-order cameras and the like can be saved.

Only preferred embodiments of the present application are described above, and all equivalent changes and modifications made according to the scope of the claims of the present application should be within the scope of the present application.

What is claimed is:

1. A trajectory planning method applied for a self-propelled device, wherein the self-propelled device moves on a path to form a moving trajectory, and the trajectory planning method comprises:
    obtaining a sensing data file generated by a sensing module of the self-propelled device on the path;
    importing the sensing data file into a simultaneous localization and mapping algorithm to construct a map corresponding to the path;
    importing the sensing data file into a loop closure algorithm, obtaining a pose at each unit time, and constructing an optimized trajectory on the map;
    importing the sensing data file into a cartographer localization algorithm, obtaining a pose at each unit time, and constructing a reference trajectory on the map, wherein the reference trajectory is corresponding to the moving trajectory of the self-propelled device on the path;
    comparing the reference trajectory with the optimized trajectory to determine whether the reference trajectory approaches the optimized trajectory;
    if the reference trajectory does not approach the optimized trajectory, adjusting parameters in the cartographer localization algorithm; and
    if the reference trajectory approaches the optimized trajectory, importing the parameters in the cartographer localization algorithm into the self-propelled device,
    wherein the reference trajectory and the optimized trajectory are compared by using a difference distribution method,
    wherein a pose error value of the reference trajectory relative to the optimized trajectory at each unit time is calculated by using the difference distribution method, so as to obtain a distribution ratio of a plurality of error ranges of the pose error value.

2. The trajectory planning method according to claim 1, wherein the sensing data file comprises a plurality of pieces of sensing data corresponding to time, position and directionality.

3. The trajectory planning method according to claim 2, wherein the sensing data is generated by at least one of a light detection and ranging, an inertial measurement unit and an odometer of the sensing module.

4. The trajectory planning method according to claim 1, wherein a distribution ratio of a minimum error range in the plurality of error ranges is taken and compared with a preset distribution ratio, so as to determine whether the reference trajectory approaches the optimized trajectory.

5. The trajectory planning method according to claim 4, wherein if the distribution ratio of the minimum error range is less than the preset distribution ratio, the parameters in the cartographer localization algorithm are adjusted, then the sensing data file is imported into the cartographer localization algorithm with the adjusted parameters, so as to obtain a pose at each unit time again and to obtain a new reference trajectory, and the new reference trajectory and the optimized trajectory are compared again so as to obtain a distribution ratio of the new minimum error range is greater than the preset distribution ratio, the parameters in the cartographer localization algorithm with the adjusted parameters are imported into the self-propelled device.

6. A trajectory planning system, comprising:
a self-propelled device, moving on a path to construct a moving trajectory, wherein the self-propelled device is provided with a sensing module, and the sensing module senses a topographical feature on the path of the self-propelled device so as to generate a sensing data file; and
a calculating device, obtaining the sensing data file and executing the following steps:
importing the sensing data file into a simultaneous localization and mapping algorithm to construct a map corresponding to the path;
importing the sensing data file into a loop closure algorithm, obtaining a pose at each unit time, and constructing an optimized trajectory on the map;
importing the sensing data file into a cartographer localization algorithm, obtaining a pose at each unit time, and constructing a reference trajectory on the map, wherein the reference trajectory is corresponding to the moving trajectory of the self-propelled device on the path;
comparing the reference trajectory with the optimized trajectory to determine whether the reference trajectory approaches the optimized trajectory;
if the reference trajectory does not approach the optimized trajectory, adjusting parameters in the cartographer localization algorithm; and
if the reference trajectory approaches the optimized trajectory, importing the parameters in the cartographer localization algorithm into the self-propelled device,
wherein the reference trajectory and the optimized trajectory are compared by using a difference distribution method,
wherein a pose error value of the reference trajectory relative to the optimized trajectory at each unit time is calculated by using the difference distribution method, so as to obtain a distribution ratio of a plurality of error ranges of the pose error value.

7. The trajectory planning system according to claim 6, wherein the sensing data file comprises a plurality of pieces of sensing data corresponding to time, position and directionality.

8. The trajectory planning system according to claim 7, wherein the sensing data is generated by at least one of a light detection and ranging, an inertial measurement unit and an odometer of the sensing module.

9. The trajectory planning system according to claim 6, wherein a distribution ratio of a minimum error range in the plurality of error ranges is taken and compared with a preset distribution ratio, so as to determine whether the reference trajectory approaches the optimized trajectory.

10. The trajectory planning system according to claim 9, wherein if the distribution ratio of the minimum error range is less than the preset distribution ratio, the parameters in the cartographer localization algorithm are adjusted, then the sensing data file is imported into the cartographer localization algorithm with the adjusted parameters, so as to obtain a pose at each unit time again and to obtain a new reference trajectory, and the new reference trajectory and the optimized trajectory are compared again so as to obtain a distribution ratio of a new minimum error range; and when the distribution ratio of the new minimum error range is greater than the preset distribution ratio, the parameters in the cartographer localization algorithm with the adjusted parameters are imported into the self-propelled device.

* * * * *